United States Patent
Hunt et al.

(10) Patent No.: US 7,926,981 B2
(45) Date of Patent: Apr. 19, 2011

(54) OPTICAL FIBER ILLUMINATION

(75) Inventors: Alexander Hunt, Research Triangle Park, NC (US); Allan Johansson, Lund (SE); Linda-Marie Nilsson, Loddekopinge (SE); Rene Nilsson, Eslov (SE); Fredrik Lonn, Sodra Sandby (SE); Lars Weberg, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 338 days.

(21) Appl. No.: 11/745,604

(22) Filed: May 8, 2007

(65) Prior Publication Data

US 2008/0278964 A1 Nov. 13, 2008

(51) Int. Cl.
*F21V 23/04* (2006.01)

(52) U.S. Cl. ........ 362/276; 362/551; 362/555; 362/558; 362/577

(58) Field of Classification Search .................. 362/577, 362/800, 555, 551, 558, 276, 802
See application file for complete search history.

(56) References Cited

U.S. PATENT DOCUMENTS

| 6,435,690 | B1 * | 8/2002 | Till ................................ 362/88 |
| 2003/0210780 | A1 | 11/2003 | Pratt et al. | |
| 2009/0003014 | A1 * | 1/2009 | Jablonski ..................... 362/602 |

FOREIGN PATENT DOCUMENTS

| WO | WO 02/098006 A1 | 12/2002 |
| WO | WO 2004/098078 A1 | 11/2004 |

OTHER PUBLICATIONS

Partial International Search dated Mar. 27, 2008 issued in a corresponding PCT application No. PCT/IB2007/054523, 3 pages.
International Search Report and Written Opinion dated Jun. 11, 2008 issued in a corresponding PCT application No. PCT/IB2007/054523, 17 pages.
International Preliminary Report on Patentability dated Jul. 17, 2009, issued in corresponding PCT application No. PCT/IB2007/054523, 15 pages.

* cited by examiner

*Primary Examiner* — Ali Alavi
*Assistant Examiner* — Mary Zettl
(74) *Attorney, Agent, or Firm* — Harrity & Harrity, LLP

(57) ABSTRACT

A portable device or a cover for a portable device includes a light source to emit light and an optical fiber to illuminate based on light received from the light source.

14 Claims, 4 Drawing Sheets

OPTICAL FIBER ILLUMINATION

BACKGROUND

Description of Related Art

The proliferation of devices, such as hand-held, portable and mobile communication devices, has grown tremendously within the past decade. Given the technological advances of recent years, communication and information exchange has been redefined. With the development of multi-functional devices, coupled with anywhere, anytime connectivity, today's users are afforded an expansive platform to communicate with one another. In turn, our reliance on such devices has comparatively grown in both personal and business settings.

In today's economy, however, sometimes the appearance of a product can be just as appealing to consumers as the utility of the product. This holds true for many products such as cars, televisions, lamps, clothes, etc. Undeniably, devices, such as, mobile phones, personal digital assistants (PDAs), or other type of computation or communication devices have gone through a significant transition in their overall structure. Typically, these devices are becoming smaller, sleeker, and lighter. Consumers may purchase these types of devices in different colors, and with a multitude of accessories. Additionally, some of these devices may include certain lighting effects, such as emitting a certain light sequence around a keypad during power-on/off cycles. Some of these devices may also include specially designed and expensive light guides.

SUMMARY

According to one aspect, a device cover may include a faceplate having a shape to match that of a portable device. The faceplate may include a light source to emit light, and an optical fiber to illuminate based on the light received from the light source.

Additionally, the faceplate may further include an interface. The interface may receive power from the portable device, and supply the received power to the light source.

Additionally, the interface may receive power from the portable device if an event associated with the portable device occurs.

Additionally, the event may be a communication event associated with the portable device.

Additionally, the faceplate may include a power supply.

Additionally, the faceplate may further include an interface. The interface may receive an indication from the portable device if an event occurs.

Additionally, the power supply may supply power to the light source if the interface receives the indication.

Additionally, the light source may include a light emitting diode to emit light to the optical fiber.

Additionally, the light emitting diode may emit light for a time period that is less than the duration of the event.

According to another aspect, a device accessory may include a case to cover front and back portions of a portable device. The case may include a front portion and a back portion, where at least one of the front portion or the back portion may include a light source to emit light, and an optical fiber to illuminate based on light received from the light source.

Additionally, the at least one of the front portion or the back portion may include an interface. The interface may receive power from the portable device.

Additionally, the interface may receive power from the portable device if an event associated with the portable device occurs.

Additionally, the case may further include a power source.

According to yet another aspect, a portable device may include a housing that may include a light source to emit light, and an optical fiber to illuminate based on the light emitted from the light source.

Additionally, the light source may emit light if an event associated with an operation of the portable device occurs.

Additionally, the light source may emit light for a time period that is less than the duration of the event.

Additionally, the event may include a communication event or a device event.

Additionally, the housing may further include a sensor.

Additionally, the light source may emit light if the sensor receives a stimulus.

Additionally, the light source may include a light coupler.

According to a further aspect, a mobile phone may include a housing that includes an optical fiber, and a light source that may include different color lights to illuminate the optical fiber, where the optical fiber illuminates and provides visual cues to a user.

Additionally, the housing may further include a front housing and a back housing, where both the front housing and the back housing may include the optical fiber.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following detailed description does not limit the invention.

Overview

Implementations described herein may provide a device that may include optical fiber illumination features, or an accessory of a device that may include optical fiber illumination features. For example, in one implementation, a frame or a housing of a device, such as a computation, communication, image capturing, and/or AV player/recording device, may include optical fiber illumination features. In another implementation, an accessory for a device, such as a cover (e.g., a faceplate or a case) may include optical fiber illumination features. A light source may include any component that emits light. The light source may emit light based on a certain event or stimulus. Various colored lights may be employed and associated with a corresponding event or stimulus. The optical fiber may be illuminated and may provide a user with a visual cue signifying a certain event or stimulus.

The description to follow will describe exemplary optical fiber illumination structures, such as a device cover with optical fiber illumination features, or a device with optical fiber illumination features.

Exemplary Optical Fiber Illumination Structures

Exemplary Device Cover

Figure 1:
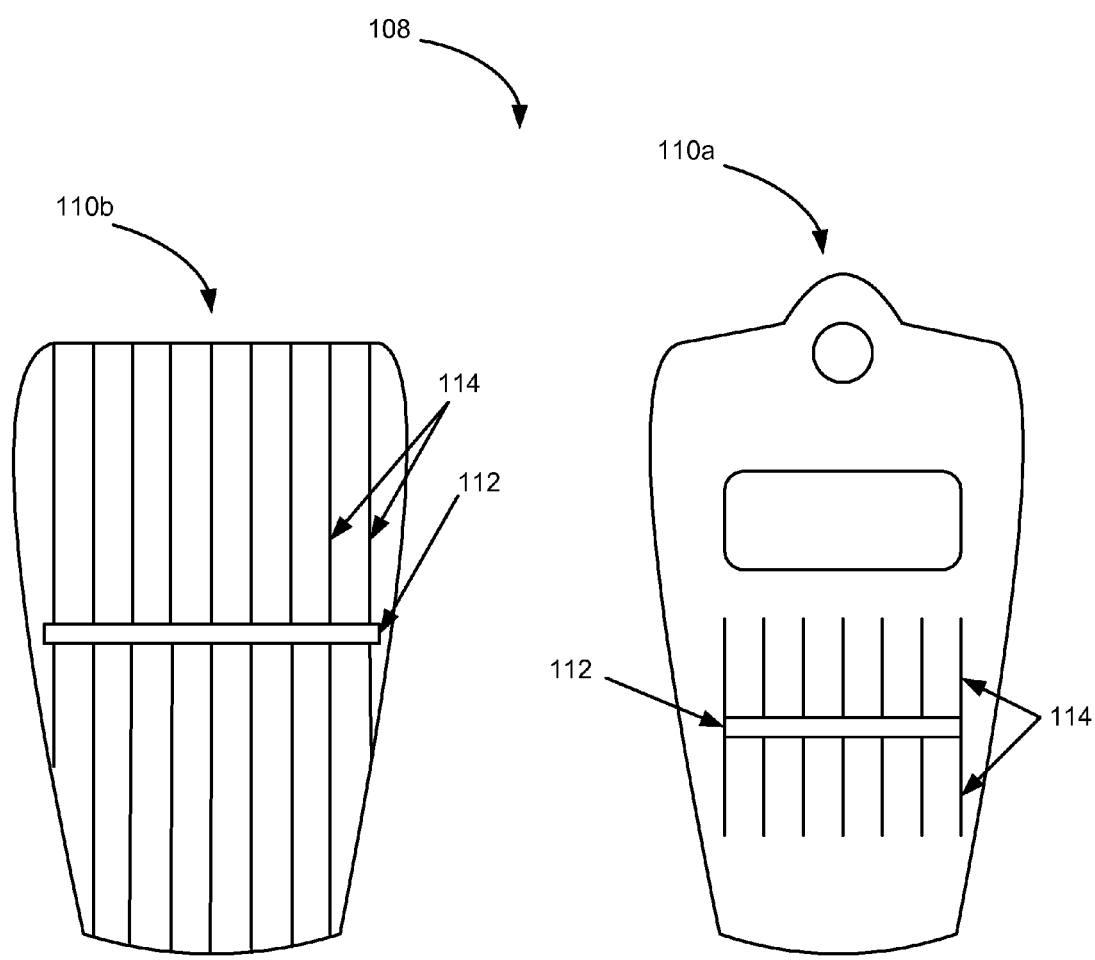
FIG. 1 is a diagram of exemplary components of a device cover with optical fiber illumination features.

FIG. 1 illustrates an exemplary device cover 108. As illustrated in FIG. 1, device cover 108 may include front faceplate cover 110a, back faceplate cover 110b, light source 112 and optical fiber 114. FIG. 1 illustrates an exemplary arrangement of light source 112 and optical fiber 114. In other implementations, for example, light source 112 and optical fiber 114 may be different in number and placement. In addition, components of light source 112 may be located in different regions of device cover 108.

For discussion purposes only, consider device cover 108 suitable for a flip-style mobile phone (not illustrated). In other implementations, device cover 108 may be suitably configured for other device styles, such as, tablet style, slide-up style, or twist style. Additionally, in other implementations, device cover 108 may be suitably configured for other types of communication, computation, image capturing, and/or AV player/recording devices.

Front faceplate cover 110a and back faceplate cover 110b may cover front and back portions of a device, respectively. Front faceplate cover 110a and back faceplate 110b may each include a configuration that is in correspondence to the configuration of the device, such that certain portions of the device may be exposed, while other portions of the device may be covered. Front faceplate cover 110a and back faceplate cover 110b may include, for example, polymers, such as plastic.

Figure 2:
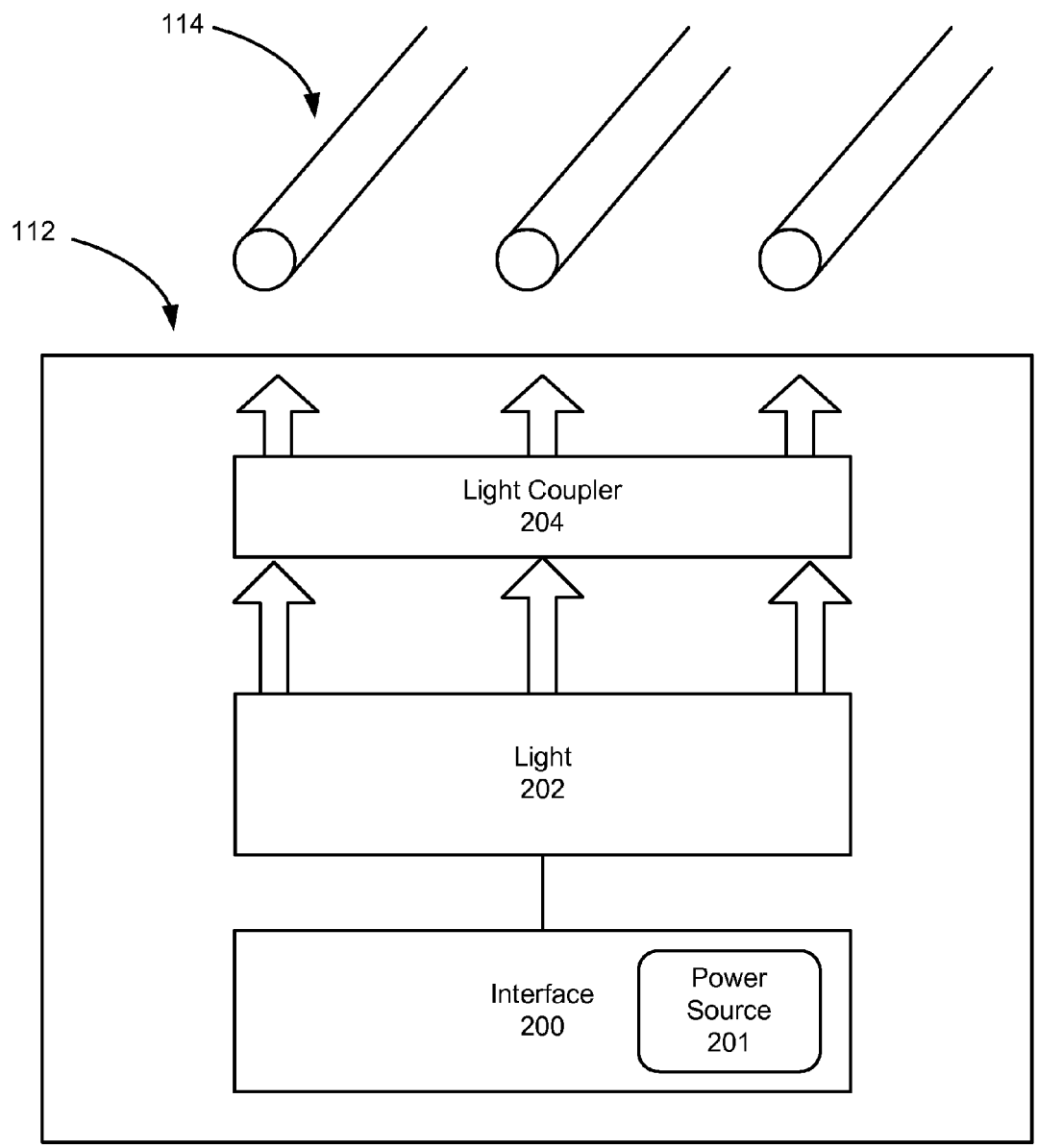
FIG. 2 is a diagram of exemplary components of the light source of FIG. 1.

Light source 112 may include one or more components to generate and emit light into optical fiber 114. Light source 112 may be incorporated with front faceplate cover 110a and back faceplate cover 110b, respectively. Referring to FIG. 1 and FIG. 2, light source 112 will be described in greater detail.

FIG. 2 illustrates exemplary components of light source 112. As illustrated in FIG. 2, light source 112 may include interface 200, light emitter 202, and light coupler 204. Although FIG. 2 illustrates a variety of components for light source 112, in other implementations, light source 112 may include fewer, different or additional components.

Interface 200 may supply power to other components of light source 112. In one implementation, interface 200 may receive power from a corresponding interface (not illustrated) located on, for example, an outer surface of a device. For example, interface 200 may come in contact with the corresponding interface of the device when front faceplate cover 110a and/or back faceplate cover 110b are utilized (e.g., attached to the device). Thus, power from the device may be supplied to front faceplate cover 110a and/or back faceplate cover 110b. In another implementation, interface 200 may include a power source 201. Power source 201 may include a battery (i.e., rechargeable or non-rechargeable). For example, the battery may include a non-rechargeable battery, such as a micro-battery (e.g., zinc air, silver oxide, alkaline manganese, or lithium manganese). Interface 200 may include a driving system (not illustrated). The driving system may include any logic, as described below, so that light emitter 202 emits light. For example, if light emitter 202 includes light emitting diodes (LEDs), the driving system of interface 200 may include transistors and resistors to regulate current supplied to the LEDs.

"Logic", as used herein may include hardware (e.g., an application specific integrated circuit (ASIC), a field programmable gate array (FPGA)), software, a combination of software and hardware, or hybrid architecture.

Light emitter 202 may include any component that emits light. For example, light emitter 202 may include LEDs. The LEDs may include various materials to emit different color light (e.g., gallium nitride (GaN), indium gallium nitride (InGaN), aluminum gallium nitride (AlGaN), or aluminum indium gallium phosphide (AlInGaP)).

Light coupler 204 may include any component that directs light received to optical fiber 114. Light coupler 204 may include a transparent, silicon-based boundary, such as glass, having a selective index of refraction that provides high coupling efficiency between light emitter 202 and optical fiber 114.

Returning to FIG. 1, optical fiber 114 may include any fiber suitable for optical fiber illumination. Optical fiber 114 may be incorporated with front faceplate cover 110a and back faceplate cover 110b, respectively. The refractive index and transmission leakage of optical fiber 114 for purposes of optical fiber illumination may be determined based on the material of front faceplate cover 110a and back faceplate cover 110b. For example, optical fiber 114 may include glass. Further, the relative size of the optical fiber 114 may be determined based on the thickness of front faceplate cover 110a and back faceplate cover 110b.

Device cover 108 may provide optical fiber illumination features in response to certain events or stimuli. In one implementation, interface 200 may receive power from the device when, for example, a communication event, a device event, or a stimulus occurs, as described below. In this regard, the device may include processing logic, so that it recognizes that device cover 108 is utilized (e.g., recognizes a connection exists between interface 200 and the corresponding interface of the device), and may supply power to interface 200. A user of device cover 108 may receive visual cues of an event or stimulus based on the optical fiber illumination features.

Certain occurrences may be characterized as falling under more than one category. Accordingly, the following categories are merely exemplary in nature, and provided for discussion purposes only.

A communication event may include any occurrence relating to information exchange. For example, a communication event may include receipt or transmittance of incoming or outgoing information by the device, such as receiving an incoming call, transmitting a SMS message, a MMS message, or an e-mail, transferring a file from an external drive to the device, or uploading information to a web site.

A device event may include any occurrence relating to the operation of the device. For example, a device event may include a status or mode of the device (e.g., power-up and shut-down cycles, sleep mode, or idle mode), alerts (e.g., low on power), reminders (e.g., missed calls or messages), timers (e.g., camera self-timer), or special effects (e.g., in connection with gaming).

A stimulus may include any occurrence originating external from device cover 108. For example, a stimulus may include an environmental stimulus (e.g., darkness) or a physical stimulus (e.g., human touch of a user).

In another implementation, interface 200 may not receive power from the handheld device because interface 200 may include power source 201, as previously discussed. Accordingly, interface 200 may only receive an indication that a communication event, device event, or stimulus occurred.

In another implementation, device cover 108 may include a detector (not illustrated). The detector may include a sensor responsive to a stimulus. The detector may include processing logic. Thus, when a stimulus occurs, the detector may provide an indication to light source 112 so as to provide optical fiber illumination. For example, if the detector is a touch sensor, a user's hand may touch the detector causing optical fiber illumination. Similarly, if the detector is a light sensor, when the detector is exposed to a certain level of darkness, device cover 108 may provide optical fiber illumination.

In another implementation, device cover 108 may be configured to expose a detector (not illustrated) of the device. Thus, if device cover 108 is being utilized, the device may supply power and/or indication to interface 200. Device cover 108 may provide optical fiber illumination.

In any of the above implementations, light emitter 202 may emit light in a blinking fashion or some other type of light sequence or effect. Alternatively or additionally, light emitter 202 may emit one or more colors of light. In one implementation, optical fiber illumination may last for a limited duration, despite the continuing existence of a particular event or stimulus, in order to conserve power of power source 201 and/or power of the device.

Exemplary Device

Figure 3:
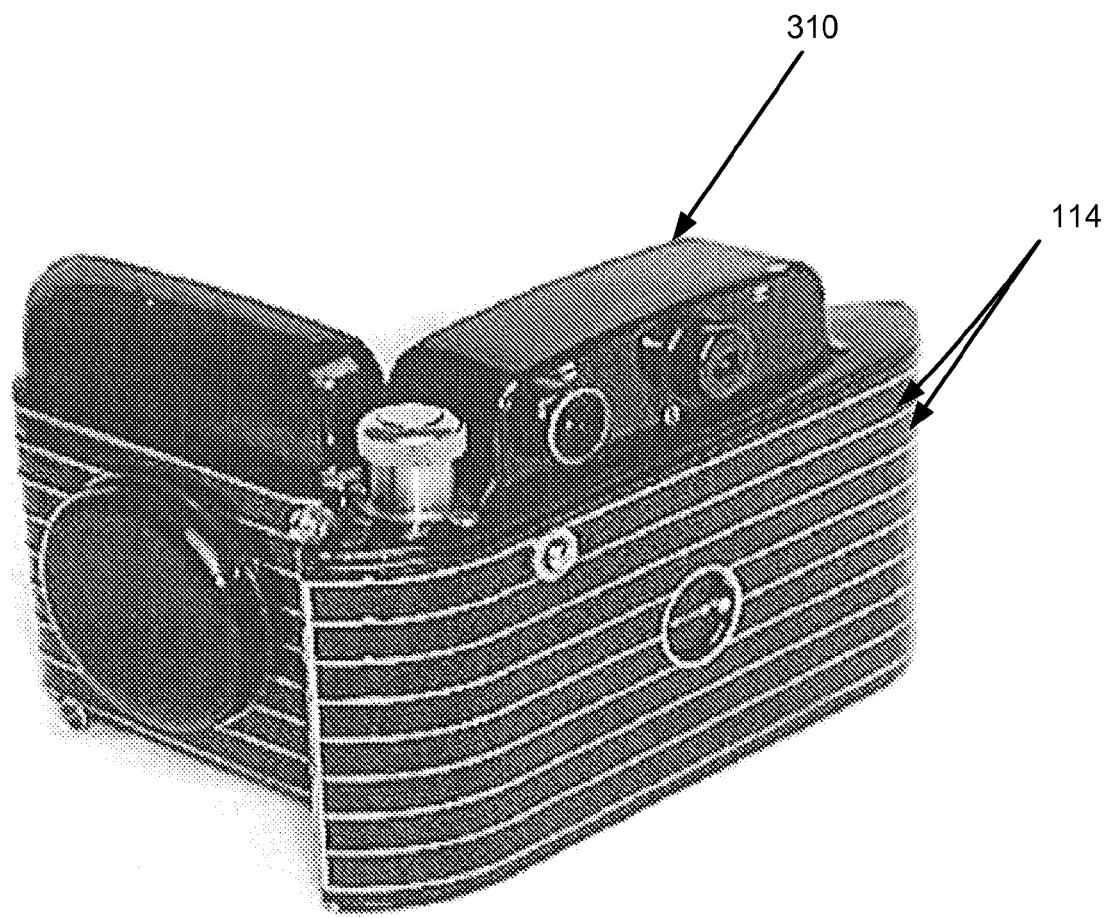
FIG. 3 is a diagram of exemplary components of a device with optical fiber illumination features.

FIG. 3 is a diagram of exemplary components of a device with optical fiber illumination features. User terminal 310 may include optical fiber 114. FIG. 3 illustrates an exemplary arrangement of optical fiber 114. In other implementations, for example, optical fiber 114 may be different in number and placement. Alternatively, or additionally, optical fiber 114 may be different in shape. For example, due to the flexible, bendable material of optical fiber 114 a variety of light emitting shapes may be possible (e.g., rings). In one implementation, user terminal 310 may include any type of computation, communication, image capturing and/or AV player/recording device. For example, user terminal 310 may include a mobile phone, a personal digital assistant (PDA), and/or a multimedia player. Optical fiber 114 may include any fiber suitable for optical fiber illumination. Optical fiber 114 may be incorporated with, for example, the frame or the housing of user terminal 310. The refractive index and transmission leakage of optical fiber 114 for purposes of optical fiber illumination may be determined based on the material of the frame or the housing of user terminal 310. For example, optical fiber 114 may include glass. Further, the relative size of the optical fiber 114 may be determined based on the thickness of the frame or the housing of user terminal 310.

Figure 4:
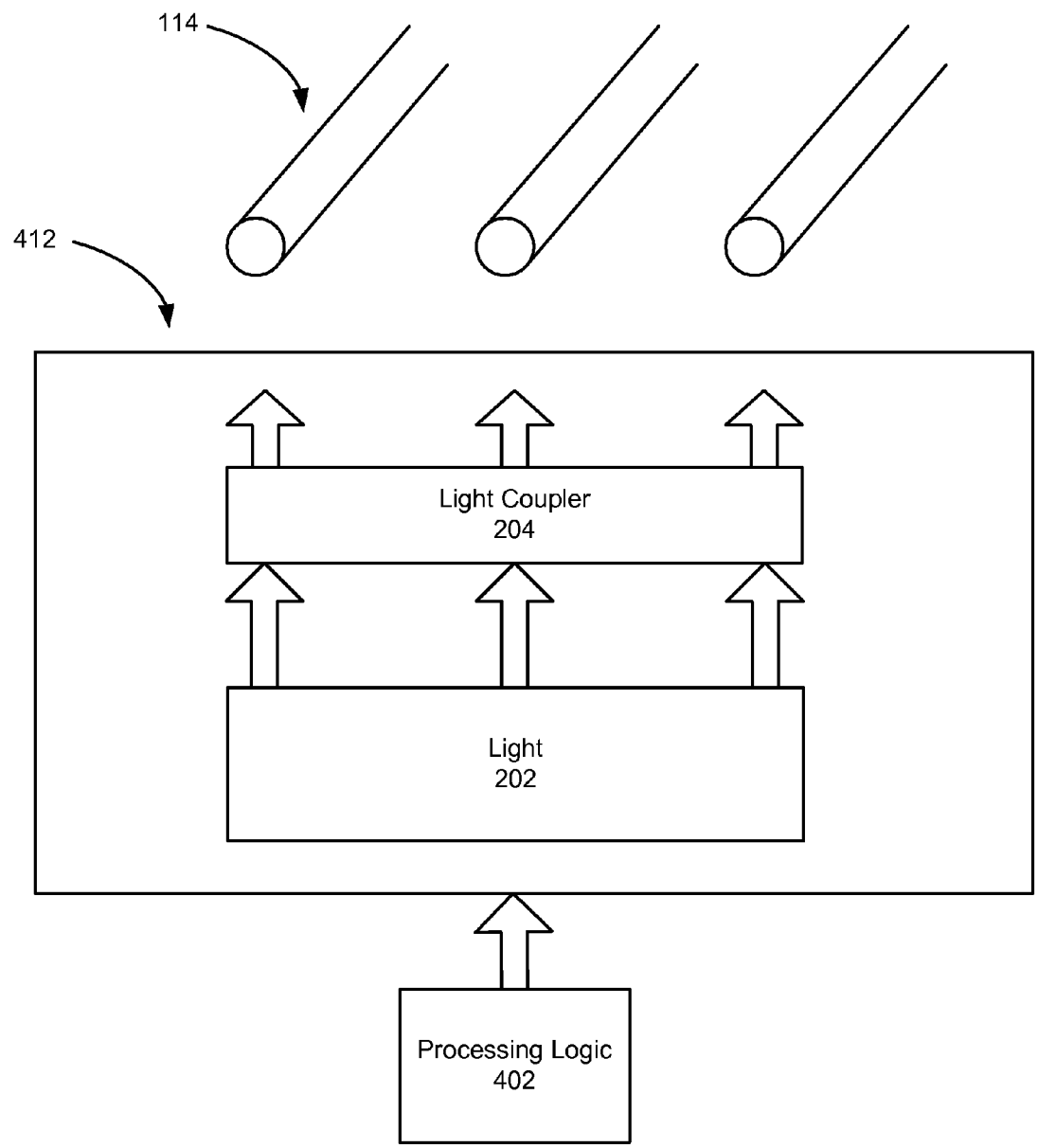
FIG. 4 is a diagram of exemplary components of a light source of the user device of FIG. 3.

User terminal 310 may include a light source (not illustrated in FIG. 3). FIG. 4 is a diagram of exemplary components of light source 412 of user terminal 310.

As illustrated in FIG. 4, user terminal 310 may include processing logic 402 and light source 412. Although FIG. 4 illustrates a variety of components for light source 412, in other implementations, light source 412 may include fewer, different or additional components.

Processing logic 402 may include a microprocessor, a data processor, a network processor, an application specific integrated circuit (ASIC), a programmable logic device (PGA), or another type of processing logic that may interpret and execute instructions. Processing logic 402 may control the operation of user device 310 and its components. Processing logic 402 may provide output to light source 412 in response to various events, such as communication events, device events, or other stimuli, as previously discussed above. Processing logic 402 may include a driving system (not illustrated). The driving system may include any logic so that light source 412 emits light. For example, if light source 412 includes LEDs, the driving system of processing logic 402 may include transistors and resistors to regulate current supplied to the LEDs. Light source 412 may emit light in response to output received from processing logic 402.

Light source 412 may include light emitter 202 and light coupler 204. Light source 412 may be incorporated with, for example, the frame or the housing of user terminal 310.

Light emitter 202 and light coupler 204 may be similar to that described in FIG. 2. Accordingly, further discussion related to light emitter 202 and light coupler 204 has been omitted.

User device 310 may provide optical fiber illumination features in response to certain events or stimuli. In one implementation, processing logic 402 may receive indications of an occurrence of a communication event, device event or some other stimulus from another component (not illustrated) of user device 310 (e.g., a transceiver, a keypad or a detector). Processing logic 402 may include logic associated with these events so that optical fiber illumination may occur. For example, processing logic 402 may provide an output to light source 412 indicating such an occurrence. Light emitter 202 may emit light to optical fiber 114 in correspondence to the received output from processing logic 402.

For example, user device 310 may receive an incoming call. Processing logic 402 may include logic to alert the user of user device 310 that an incoming call is being received by illuminating optical fiber 114. For example, the user of user device 310 may have a ring function set to off because the user is in a meeting. Light source 412 may receive output from processing logic 402 based on this occurrence (i.e., the communication event). Light emitter 202 may emit light to optical fiber 114 via light coupler 204. In this way, the optical illumination feature of user device 310 may provide the user with a visual cue that an incoming call is being received.

In another implementation, processing logic 402 may not provide output to light source 412. Thus, processing logic 402 may be omitted for purposes of providing optical fiber illumination. For example, another component (e.g., a transceiver of user device 310 (not illustrated)) may indicate to light source 412 of the incoming call. In another example, a detector (not illustrated) may indicate to light source 412 the occurrence of a certain stimulus.

In any of the above implementations, light emitter 202 may emit light in a blinking fashion or some other lighting sequence or effect. Alternatively or additionally, light emitter 202 may emit one or more colors of light. Optical fiber illumination features may last for a limited duration, despite the continuing existence of a particular event or stimulus, in order to conserve power of user device 310.

The implementations described herein are not limited to any specific hardware, software, combination of hardware and software, or other type of hybrid architecture.

CONCLUSION

Implementations described herein may provide a device or an accessory for a device (e.g., a cover or a case) with optical fiber illumination features in response to various events or stimuli. Unlike light guides, optical fibers may be inexpensive, easily attainable, adaptable to thin, flat surfaces, and provide superior illumination.

The foregoing description of exemplary embodiments provides illustration and description, but is not intended to be exhaustive or to limit the invention to the precise form disclosed. Modifications and variations are possible in light of the above teachings or may be acquired from practice of the invention.

For example, while a series of outputs has been described with regard to light source 112 of FIG. 2 and light source 412 of FIG. 4, the order of outputs may be modified in other implementations. Further, non-dependent outputs may be performed in parallel.

It should be emphasized that the term "comprises" or "comprising" when used in the specification is taken to specify the presence of stated features, integers, steps, or components but does not preclude the presence or addition of one or more other features, integers, steps, components, or groups thereof.

It will be apparent that aspects, as described above, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware could be designed to implement these aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device cover, comprising:
    a removable faceplate including an interior surface that corresponds to an exterior surface of a portable device when the portable device is received within the faceplate, where the device cover is separate from the portable device;
    a detector to:
        sense at least one environmental condition, including ambient light levels, and
        sense at least one physical condition, including a touch of a user associated with the portable device;
    an interface coupled to the portable device to selectively receive power, from the portable device, when the portable device is received in the faceplate, where the interface receives the power from the portable device in response to:
        receiving, by the interface and from the portable device, a first indication, associated with the portable device detecting a connection between the interface and the portable device when the portable device is received within the faceplate,
        sensing, by the detector, the at least one environmental condition,
        sensing, by the detector, the at least one physical condition, and
        receiving, by the interface and from the portable device, a second indication, where the second indication corresponds to an occurrence, in the portable device, of at least one of a communication event or a device event associated with the portable device;
    a light source to:
        receive the power from the interface, and
        emit light using the power; and
    an optical fiber to:
        receive some of the light emitted from the light source, and
        illuminate based on the light received from the light source.

2. The device cover of claim 1,
    where the occurrence includes the communication event, and
    where the communication event includes at least one of a receipt or a transmission of information by the portable device.

3. The device cover of claim 1, where the faceplate further comprises:
    a supplemental power supply.

4. The device cover of claim 3, where the supplemental power supply supplies power to the light source in response to the occurrence of at least one of the communication event or the device event.

5. The device cover of claim 1, where the light source comprises:
    a light emitting diode (LED) to emit light to the optical fiber.

6. The device cover of claim 5, where the LED emits light for a time period that is less than a duration of the at least one of the communication event or the device event.

7. The device cover of claim 1, where the light source comprises:
    a light coupler to direct the light from the light source to the optical fiber.

8. The device cover of claim 1, where the occurrence includes the device event, and
    where the device event includes at least one of a status mode of the portable device, a reminder, a timer, or a gaming event.

9. The device cover of claim 1,
    where the faceplate includes:
        a front faceplate that is oriented to a front surface of the portable device when the portable device is received within the faceplate, and
        a rear faceplate that is oriented to a rear surface of the portable device when the portable device is received within the faceplate, and
    where the light source includes:
        a front light source integrated into the front faceplate, and
        a rear light source integrated into the rear faceplate.

10. The device cover of claim 1, where the emitted light comprises different colored lights to illuminate the optical fiber.

11. A method, comprising
    coupling a device cover to a portable device, where the device cover is separate from the portable device;
    detecting, by the device cover:
        a first indication, from the portable device, that the portable device has detected the coupling of the device to the portable device,
        at least one environmental condition, including ambient light levels,
        at least one physical condition, including a touch of a user, and
        a second indication, from the portable device, of at least one occurrence of an event, including at least one of a communication event or a device event associated with the portable device;
    selectively receiving, by the device cover and in response to the detecting, power from the portable device;
    emitting, by a light source in the device cover, light using the selectively received power; and
    illuminating, by the device cover and based on the light received from the light source, a visible optical fiber in the device cover in response to detecting, by the device cover, of:

the first indication that the portable device has detected the coupling of the device to the portable device,
the at least one environmental condition,
the at least one physical condition, and
the second indication of the at least one occurrence.

12. The method of claim 11, where emitting the light includes:
emitting the light for a time period that is less than a duration of the event.

13. The method of claim 11,
where the device cover includes a rear faceplate that includes an integrated rear light source and is oriented to a rear surface of the portable device when the portable device is received within the device cover, and
where emitting the light includes emitting light from the rear light source.

14. The method of claim 11 where emitting the light includes:
emitting lights of different colors.

* * * * *